United States Patent [19]

Aron

[11] 3,989,643

[45] Nov. 2, 1976

[54] RUBBER COMPOUND ADDITIVE

[75] Inventor: Erwin Aron, Clifton, N.J.

[73] Assignee: Technical Processing, Inc., Paterson, N.J.

[22] Filed: Aug. 28, 1974

[21] Appl. No.: 501,447

[52] U.S. Cl. .................. 252/431 C; 260/23.7 M
[51] Int. Cl.² ........................................ B01J 31/12
[58] Field of Search ........... 252/431 C; 260/23.7 M, 260/752

[56] References Cited
UNITED STATES PATENTS 3,437,621   4/1969   Aron .............................. 260/752 X Primary Examiner—W.J. Shine
Attorney, Agent, or Firm—Kenyon & Kenyon

[57] ABSTRACT

Improved rubber compounding is achieved by adding the zinc oxide and fatty acid conventionally employed as accelerator activators in the form of a zinc salt of the fatty acid dispersed in an alkylphenoxy polyglycol.

6 Claims, No Drawings

RUBBER COMPOUND ADDITIVE

The present invention relates to rubber compounding aids. More specifically this invention relates to an improved composition and process for incorporating conventionally-employed accelerator activators into rubber compounds.

As is well known, rubber compositions or compounds comprise rubber itself, which may be natural rubber, reclaimed rubber or a synthetic rubber such as GRS or SBR rubbers; a vulcanization accelerator, commonly a mercaptan or sulfide; accelerator activators, commonly zinc oxide and a fatty acid such as stearic acid; an antioxidant; a softener or extender; and a filler. Other components such as retarders, waxes, blowing agents and chemical plasticizers may be present as well. Still other additives such as mold release agents and dispersing agents may be employed primarily to improve the processability of the rubber during the compounding step. In particular, the processing aids have been specially formulated to reduce mixing time and mixing temperature. Reduced mixing times are desirable to increase the effective capacity of mixing equipment, while reduced mixing temperatures are desired to minimize the danger of scorching the rubber during compounding.

It now has been found in accordance with this invention that if the zinc oxide and fatty acid commonly employed as accelerator activators are added in the form of a dispersion of the zinc salt of the fatty acid in a monoalkylphenoxy polyglycol, activity as accelerator activators is unimpaired and improved compounding is achieved. Thus, improved mixing and dispersion of the various components throughout the compound are obtained. Furthermore, mixing is completed in a shorter time and at lower mixing temperatures than when zinc oxide and fatty acid are added separately.

Stearic acid is most commonly employed as the fatty acid accelerator, and hence the use of zinc stearate is preferred in the practice of this invention. However, other zinc salts of higher fatty acids can be employed if desired. In general, salts of acids having from about 10 to about 20 carbon atoms can be employed. In addition, the acid may be a saturated fatty acid such as stearic acid or it may be an olefinically unsaturated acid such as oleic acid. The acid ester moiety may be derived from a single acid or it may be derived from a mixture of acids. For example, zinc salts of coconut fatty acids can be employed. As is well known, coconut fatty acids comprise a mixture of acids having from 8 to 18 carbons. The typical analysis of coconut oil acid is as follows:

| Fatty Acid Composition of Coconut Oil Acid | | |
|---|---|---|
| Acid | | Weight Percent |
| Saturated | $C_8$ | 7.9 |
| Saturated | $C_{10}$ | 7.2 |
| Saturated | $C_{12}$ | 48.0 |
| Saturated | $C_{14}$ | 17.5 |
| Saturated | $C_{16}$ | 9.0 |
| Saturated | $C_{18}$ | 2.1 |
| Unsaturated | $C_{18}$ | 5.7 |
| Diunsaturated | $C_{18}$ | 2.6 |

The zinc acid salt is added to the rubber compound in the form of a dispersion in an alkylphenoxy polyglycol. Suitable alkylphenoxy polyglycols are those having the structural formula:

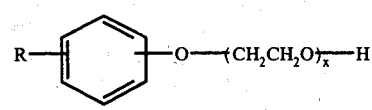

wherein R is an alkyl group (linear or branched) containing from about 8 to about 12 carbon atoms and x is a number having a value of from about 2 to about 10. It will be appreciated that compounds of this character ordinarily are not pure, but comprise mixtures of a number of closely related compounds. Accordingly, the size of the alkyl chain and the value of x are average values and are not intended to imply that the alkylphenoxy polyglycol is a pure compound.

The proportions of the zinc salt and the alkylphenoxy polyglycol in the dispersion are such that the dispersion is either a liquid or a cream to facilitate dispersion in the rubber compound. Ordinarily, the amount of alkylphenoxy polyglycol should be no more than approximately 50 percent of the dispersion to minimize the addition of otherwise inert materials to the rubber compound. On the other hand, ordinarily at least about 20 percent of the alkylphenoxy polyglycol is required to achieve a dispersion of suitable fluidity. Consequently, the concentration of zinc salt in the composition is from about 50 weight percent to about 80 weight percent.

The dispersion of zinc salt in the alkylphenoxy polyglycol can be achieved in any suitable fashion. It has been found, however, that a particularly advantageous procedure comprises reacting zinc oxide with one or more fatty acids to form the desired zinc salt using the selected alkylphenoxy polyglycol or alkylphenoxy polyglycols as the reaction medium. In such a procedure, the zinc oxide, one or more fatty acids and one or more alkylphenoxy polyglycols are mixed under conditions sufficient to effect reaction of the zinc oxide with the fatty acid(s) to form the zinc salt(s) and removal of the water formed during reaction. For example, mixing may be effected at temperatures slightly above the boiling point of water (up to about 130° C). It is desirable that the zinc oxide and fatty acid be employed in approximately stoichiometric amounts (i.e., about 1.9 to about 2.1 moles of fatty acid per mole of zinc oxide) and that the amount of alkylphenoxy polyglycol used as a reaction medium be the amount intended in the final rubber compounding additive of this invention.

The dispersion of zinc salt in the alkylphenoxy polyglycol is added to the rubber compound in an amount sufficient to achieve the desired affect as an accelerator activator. Ordinarily, this will require from about 0.75 to about 10 parts by weight of the zinc salt per 100 parts of total rubber compound. However, amounts of additive of from about 2 parts to about 6 parts of zinc salt per 100 parts of total compound have been found to be particularly suitable.

The compositions of this invention are added to the rubber by any suitable technique. In particular, they can be added by known rubber compounding procedures in the same manner as the zinc oxide and fatty acid were heretofore added.

As used herein, all references to percentages or parts are percentages or parts by weight.

The following examples are illustrative of the compositions of the present invention:

EXAMPLE 1

A mixture of 7.5 pounds of zinc oxide, 50.0 pounds of stearic acid (techn.), and 42.5 pounds of mononylphenoxy heptaethyleneglycol was heated to 105° C. and mixed until foaming died down and the water created by the reaction was evaporated. Mixing was continued while cooling down to room temperature. The resulting product (Compound A) solidified to a medium firm cream.

EXAMPLE 2

A mixture of 7.5 pounds of zinc oxide, 50.0 pounds of oleic acid (techn.), and 42.5 pounds of monododecylphenoxy hexaethyleneglycol was heated to 105° C. and mixed until foaming died down and the water created by the reaction was evaporated. Mixing was continued while cooling down to room temperature. The resulting product (Compound B) solidified to a medium firm cream.

EXAMPLE 3

A mixture of 15.3 pounds of zinc oxide, 64.5 neodecanoic acid (techn.), and 23.2 pounds of monononylphenoxy tetraethyleneglycol was heated to 105° C. and mixed until foaming died down and the water created by the reaction was evaporated. On cooling to room temperature the product (Compound C) formed a clear viscous liquid.

EXAMPLE 4

A series of four rubber compounds was prepared. The first was composed of SBR rubber, silica filler, zinc oxide and stearic acid. The remaining three compounds were composed of SBR rubber, silica filler and one of the compounds of this invention. The compound compositions, and the mixing temperatures and the dump temperatures for each compounding process are summarized as follows:

| Composition | Formulation No. | | | |
|---|---|---|---|---|
| | 1 | 2 | 3 | 4 |
| SBR Rubber | 100 | 100 | 100 | 100 |
| Silica | 10 | 10 | 10 | 10 |
| Zinc Oxide | .1 | — | — | — |
| Stearic Acid | 6 | — | — | — |
| Compound A | — | 13 | — | — |
| Compound B | — | — | 13 | — |
| Compound C | — | — | — | 6 |
| Mixing time min. | 7 | 5 | 5 | .5 |
| Dump Temperature, ° F. | 265 | 230 | 230 | 215 |

Formulations 2, 3 and 4 all provided mixing and dispersions of ingredients which were superior to the mixing and dispersion obtained with control Formulation No. 1. In addition, as is evident from the data, the compounds of this invention substantially reduced mixing time and mixing temperature.

Other benefits derived from the use of the materials of this invention will be obvious to those skilled in the art.

What is claimed is:

1. A composition consisting essentially of a zinc salt of a fatty acid having from about 10 to about 20 carbon atoms dispersed throughout an alkylphenoxy polyglycol having the structural formula:

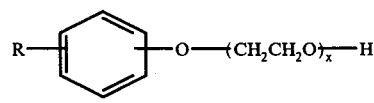

wherein R is an alkyl group containing from about 8 to about 12 carbon atoms and x is a number having a value of from about 2 to about 10, wherein the concentration of said zinc salt in said composition is from about 50 to about 80 weight percent.

2. The composition according to claim 1 wherein said zinc salt is a member selected from the group consisting of zinc stearate and zinc oleate and said alkylphenoxy polyglycol is a member selected from the group consisting of monononylphenoxy tetraethyleneglycol, monononylphenoxy heptaethyleneglycol and monododecylphenoxy hexaethyleneglycol.

3. A composition according to claim 1 consisting essentially of a mixture of zinc stearate and monononylphenoxy heptaethyleneglycol.

4. A composition according to claim 1 consisting essentially of a mixture of zinc oleate and monododecylphenoxy hexaethyleneglycol.

5. A composition according to claim 1 consisting essentially of zinc stearate and monononylphenoxy tetraethyleneglycol.

6. A method for producing the composition of claim 1 which comprises admixing zinc oxide, a fatty acid having from about 10 to about 20 carbon atoms and an alkylphenoxy polyglycol having the structural formula:

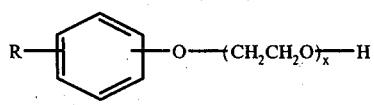

wherein R is an alkyl group containing from about 8 to about 12 carbon atoms and x is a number having a value of from about 2 to about 10, under conditions sufficient to cause the zinc oxide to react with the fatty acid and form the zinc salt of the fatty acid.

* * * * *